(12) United States Patent
Lindner-Silwester et al.

(10) Patent No.: US 8,177,237 B2
(45) Date of Patent: May 15, 2012

(54) GASTIGHT PISTON RING ARRANGEMENT

(75) Inventors: Tino Lindner-Silwester, Vienna (AT); Christian Hold, Vienna (AT); Martin Molnar, Vienna (AT)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 701 days.

(21) Appl. No.: 12/318,755

(22) Filed: Jan. 7, 2009

(65) Prior Publication Data

US 2009/0179386 A1    Jul. 16, 2009

(30) Foreign Application Priority Data

Jan. 14, 2008  (AT) .................................. A 55/2008

(51) Int. Cl.
*F16J 9/00* (2006.01)
*F16J 9/16* (2006.01)
(52) U.S. Cl. ........................ 277/487; 277/435
(58) Field of Classification Search .............. 277/434, 277/435, 487, 492, 499
See application file for complete search history.

(56) References Cited

U.S. PATENT DOCUMENTS

| 920,950 | A | * | 5/1909 | Harkins | ...................... 277/469 |
| 1,763,127 | A | * | 6/1930 | Beer | ........................... 277/489 |
| 2,047,590 | A | * | 7/1936 | Madsen | ........................ 277/489 |
| 2,055,153 | A | | 9/1936 | Madsen | |
| 2,910,332 | A | * | 10/1959 | Madsen et al. | ................ 277/446 |
| 3,632,121 | A | | 1/1972 | Wahlmark | |
| 4,185,842 | A | | 1/1980 | Magara | |
| 6,428,014 | B2 | * | 8/2002 | Scarlett | ........................ 277/435 |
| 6,712,363 | B2 | | 3/2004 | Bennitt et al. | |
| 2004/0094902 | A1 | * | 5/2004 | Brunke | ........................ 277/460 |

FOREIGN PATENT DOCUMENTS

| DE | 10234528 | | 2/2004 |
| GB | 616484 | | 1/1949 |
| GB | 895787 | | 5/1962 |
| JP | 05187551 | A * | 7/1993 |
| JP | 2001032935 | | 2/2001 |

OTHER PUBLICATIONS

English Abstract of JP 2001032935, Feb. 2001.
English Abstract of DE 10234528, Feb. 2004.

* cited by examiner

*Primary Examiner* — Gilbert Lee
(74) *Attorney, Agent, or Firm* — Dykema Gossett PLLC

(57) ABSTRACT

A segmented piston ring assembly includes piston ring segments 2 having stepped ends 5, 6, at least one piston ring segment 2 including a radial step on a radially inner peripheral surface 9 over a part of the width of the piston ring segment 2, and a single-cut sealing ring 3, which bears radially against the inside of the peripheral surface 9 of the piston ring segments 2, the sealing ring 3 including an axial recess 10, 12 which cooperates with the radial step 4 of the piston ring segment 2 to prevent relative rotation therebetween.

14 Claims, 5 Drawing Sheets

GASTIGHT PISTON RING ARRANGEMENT

BACKGROUND OF THE INVENTION

1. Field of the Invention

The present invention relates to a gastight piston ring arrangement including a piston ring made up of a plurality of piston ring segments, the ends of which are shaped such that they are axially stepped in the peripheral direction, and the stepped ends of adjacent piston ring segments, for the formation of an axial seal, are arranged lying axially one against the other.

2. The Prior Art

In piston compressors, the working fluid is compressed by a piston. The sealing elements which seal the annular gap formed between the piston and the cylinder are called piston rings. In piston compressors in double-acting construction, the gas pressure in the cover-side and crank-side compression chamber respectively fluctuates between suction and discharge pressure, the two working chamber pressure patterns being mutually out of phase by a 180° crank angle. In such applications, the piston sealing system must consequently seal in both directions, i.e. must be of double-acting configuration. In high pressure applications, on the other hand, the compression is often effected solely on the cover side, so that the piston rings in such applications always seal in one direction and reduce the varying compression chamber pressure to a normally smaller, time invariant pressure, for example the suction pressure of the stage in question. For such applications, single-acting piston rings should be used, thereby ensuring that, during the re-expansion phase, no unnecessarily high pressure is trapped in the radial gap volume between two piston rings, which would entail an unnecessary increase in piston ring wear.

Regardless of the degree of complexity of the construction, all piston rings share the feature that they are activated by the pressure differential to be sealed, i.e., are pressed with a certain surface pressure against the groove flank and the liner of the cylinder and thereby develop their sealing effect. Especially in dry-running applications, the ring wear rate, as a result of excessive surface pressures, can take on unacceptable proportions. The wear rate of PTFE-based materials, which are typically used in piston rings, generally grows considerably as the temperature of the opposite-working surface (in this case the liner) increases. The friction heat generated in the piston ring/liner sealing gap results in heating-up of the liner and, therefore, plays a considerable part. More specifically, if the rings are exposed to elevated temperatures, extrusion of the piston rings into the annular gap which is formed between the piston and the cylinder and which, in order to prevent the piston from rubbing against the liner, must have a certain minimum radial measure, can additionally markedly reduce the sealing effect of the piston rings or even destroy the piston rings. In dry-running applications, the concept of pressure balancing, where the pressure decay in the piston ring/liner sealing gap is influenced by grooves, slots, bores in the piston ring or the like such that the mean, surface-pressure-reducing gas pressure in this sealing gap is increased, is therefore made use of, especially in high pressure applications.

The way in which, in a plurality of mutually adjoining piston rings, the total pressure differential to be sealed is distributed to the individual piston rings depends on the individual relations between the prevailing pressure differential and leakage of the individual piston rings. By far the greatest contribution to the leakage by a piston ring is usually made by the gas flow through the joint of the piston ring. Since this joint grows bigger with increasing wear, the sealing effect of the rings also decreases markedly over time. The simplest possible construction of such a piston ring is here constituted by the one-piece, straight-cut form. One-piece, single-cut piston rings can only be fitted in composite pistons or can be fitted in one-piece pistons only by additional effort (for example, through the use of an additional tool or with previous warming), insofar as the piston rings are sufficiently flexible. Especially in piston rings with small diameters and thus high bending rigidity, as are used, in particular, in high pressure applications, only composite pistons can therefore be used, which is more laborious in terms of production and maintenance.

The tendency toward increasing leakage can be countered by the use of so-called gastight piston ring constructions in which the joint (in a single-cut ring) or joints (in a multi-cut segmented ring) is/are covered. A respectively cut L-shaped and right-angled ring are in this case combined, the joints of the two rings being arranged mutually offset. Such piston ring constructions are known, for example, from DE 28 29 352 A1 or from U.S. Pat. No. 3,632,121 A. Particularly in high pressure applications, where such ring constructions, due to greater seal-tightness requirements, are increasingly used, it often occurs, however, that a ring, due to the thermal and mechanical load, is forced into the joint of the other ring, which can lead to deformations and a deterioration in the sealing effect. In addition, fractures can occur as a consequence of the material weakening resulting from fully (i.e. in the radial and axial directions) covered joints.

Similarly, gastight piston ring constructions with segmented piston rings have already been known, in which a number of ring segments are combined to form a piston ring. The fundamental advantage of such segmented piston rings lies in the fact that such rings, as a result of their multipiece nature, can also easily be used in one-piece, non-composite pistons. Such a piston ring is described, for example, in U.S. Pat. No. 2,055,153 A. The sealing in the radial and axial directions is here effected by the shaping of the ring segments. Due to the necessary sealing in the radial and axial directions, a complex shape of the ring segments is obtained, however, which is complicated and difficult to produce. Such a piston ring is therefore laborious in terms of its production.

In another version of a gastight piston ring arrangement according to JP 2001-032935 A2, a single-cut piston ring having a stepped joint for axial sealing is combined with a single-cut sealing ring which bears against the radially inner peripheral surface of the piston ring and forms a seal in the radial direction. On the piston ring a projection is further provided, which engages in the joint of the sealing ring and thus prevents twisting and possible alignment of the piston ring and sealing ring joints. The sealing ring must, however, be readjustable in the event of increasing wear, i.e. it must be capable of expansion in order to maintain the seal in the radial direction. For a sufficient sealing effect, moreover, the sealing ring must be pressed against the piston ring with a certain minimum contact pressure. These requirements call for a sufficiently pliable sealing ring. The sealing ring would therefore need to be realized with small cross section. The effect of this, however, is that the sealing ring, especially in high pressure applications, can deform into the joint gaps of the piston ring, which would in turn harm the sealing effect. From this viewpoint, the sealing ring would in turn need to have a sufficiently large cross section to resist such deformations. Two conflicting requirements have thus to be met. In JP 2001-032935 A2, this is achieved by providing in addition to the sealing ring, radially on the inside, an expander ring, which presses the sealing ring, in addition to the working pressure, by a spring force mechanically against the piston ring.

An object of the present invention is therefore to at least reduce the above-stated drawbacks of known gastight piston ring arrangements.

SUMMARY OF THE INVENTION

This object is achieved according to the invention by providing on at least one piston ring segment, on the radially inner peripheral surface over a part of the width of the piston ring segment, a radial step, and by providing a single-cut sealing ring, which bears radially against the inside of the peripheral surface of the piston ring segments, and by providing on the sealing ring an axial recess, which cooperates with the radial step of the piston ring segment. As a result of this recess of the sealing ring, the sealing ring remains sufficiently pliable, even if the sealing ring has a relatively large cross section, to prevent an extrusion of the sealing ring into the joint between the piston ring segments. This shaping of the sealing ring in the peripheral direction thus ensures that, if the radial thickness is sufficient to obtain adequate resistance against extrusion into the radial gaps between the piston ring segments, the bending rigidity of the sealing ring nevertheless remains small enough that the sealing ring can readjust if the piston ring segments become worn and the sealing ring is always forced with sufficient pressure against the inner peripheral surface of the piston ring segments. The sealing ring is in this case pressed against the sealing ring segments merely by the force which is present and does not itself need to apply any expanding spring force. With a piston ring arrangement according to the invention, nor is there a need for an additional expander ring.

If a radial step is provided on each piston ring segment and a corresponding number of associated axial recesses are provided on the sealing ring, identical piston ring segments can be used, which substantially simplifies the manufacture and assembly of the piston ring arrangement.

In an advantageous embodiment, the radial step rises out of the inner peripheral surface and engages in the recess on the sealing ring. As a result of the configuration of a radial elevation, the piston ring segments are not weakened in the region of the step. Alternatively, the radial step can also be realized as a radial recess in the peripheral surface, in which case on the sealing ring, at one end of the axial recess, a radial projection is provided, which engages in the radial recess.

By providing in a piston ring segment a plurality of recesses which connect an end side of the piston ring segment to the outer peripheral surface of the piston ring segment, it is possible to achieve a pressure balancing which reduces the surface pressure between the piston ring and the fixed structural part. Given a careful design of the number of recesses in a piston ring segment, the degree of pressure balancing has been shown to be virtually no lower than that which is obtainable with a peripheral groove. As a result of the arrangement of recesses instead of a circumferential groove, the strength/extrusion resistance of the piston ring segment is not however reduced.

In order to ensure the single-acting sealing function of the piston ring arrangement, a radial groove is provided in the end side of the piston ring segment, the groove being arranged in the region of the joint of the sealing ring.

Particularly advantageously, a backup ring is provided, which bears against an end side of the piston ring segments. The use of such a backup ring can prevent the piston ring, as a result of the thermal load and the acting pressure, from being extruded into the gap between the fixed and the movable structural part and thus from being damaged or even destroyed, which would also lessen the sealing function of the piston ring arrangement. The backup ring can here be realized as a through ring or as a single-cut or multi-cut ring, in the case of a cut backup ring the backup ring segments being held together in the peripheral direction by a lock. Preferably, the backup ring segments are sealed by the lock simultaneously in the radial direction, which increases the sealing effect.

The piston ring arrangement according to the invention is advantageously used in a seal between a movable structural part and a fixed structural part, the piston ring arrangement being arranged in the movable structural part, in a recess, and at a radial distance from the floor of the recess. Particularly preferably, the piston ring arrangement according to the invention is used in a compressor, the piston ring arrangement being disposed in a piston of the compressor.

For the pressure balancing, the recess in the piston ring segment opens out on the end side facing the high pressure, in order that the high pressure reduces the surface pressure.

The backup ring is preferably arranged such that it bears against the end side facing the low pressure, since the piston ring is pressed against the low pressure side by the high pressure and thus the extrusion problem arises on the low pressure side.

The present invention is described below with reference to FIGS. 1 to 8, which figures are schematic, illustrative and non-restrictive and show advantageous embodiments.

DETAILED DESCRIPTION OF THE PREFERRED EMBODIMENTS

Figure 1:
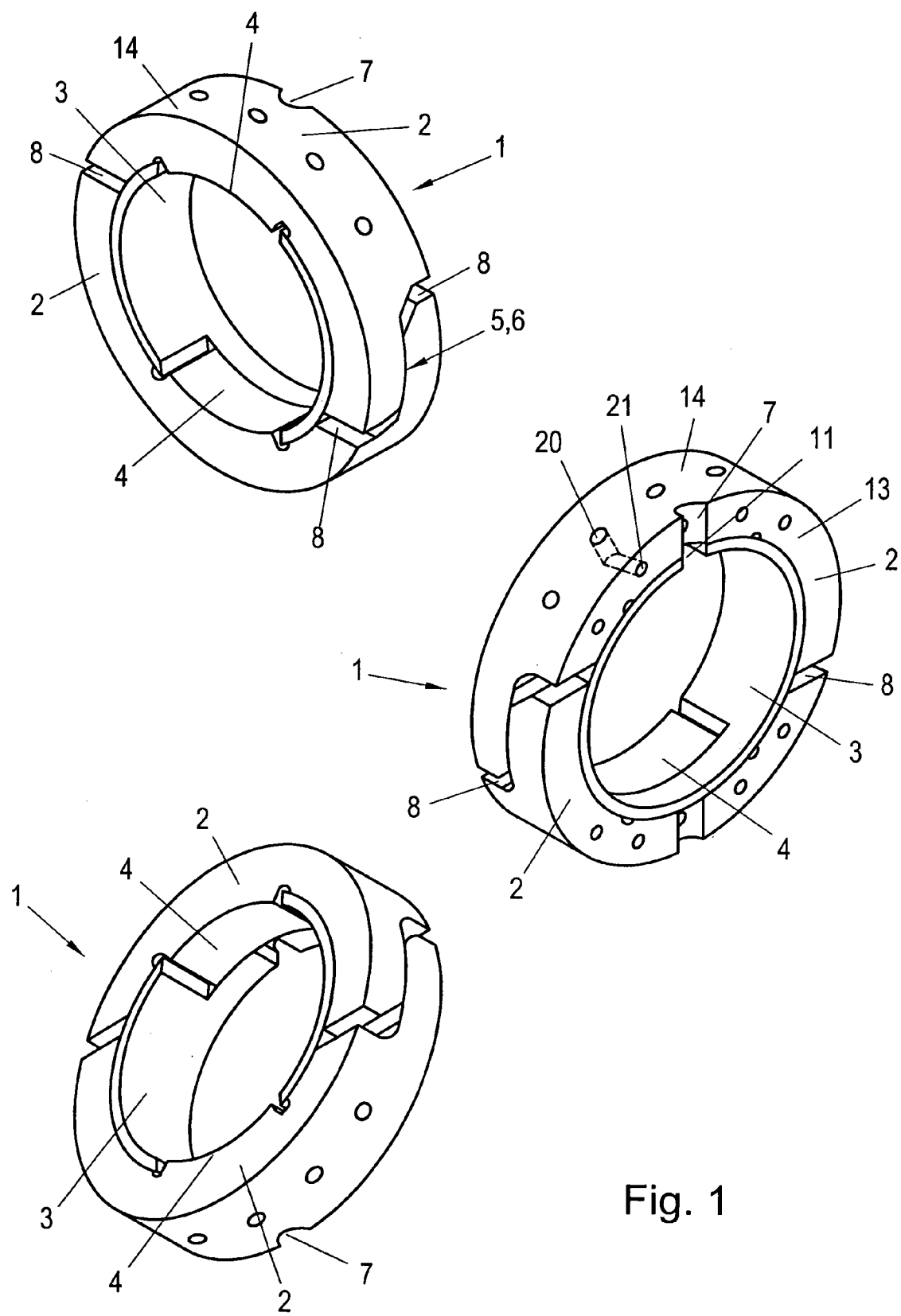
FIG. 1 shows in various views a representation of a gastight piston ring arrangement according to the invention with pressure balancing.
Figure 2:
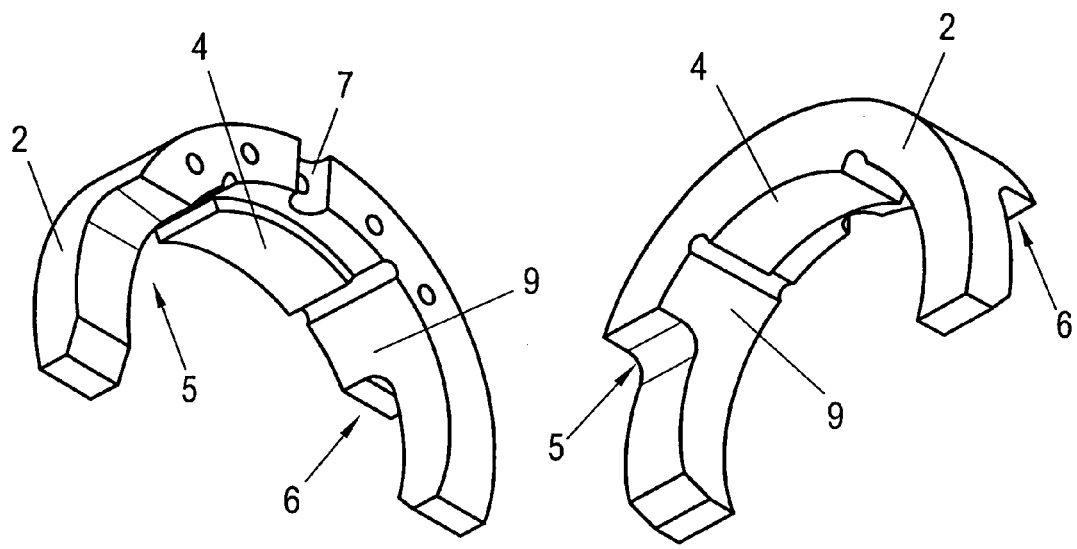
FIG. 2 shows in various views a representation of a piston ring segment of a gastight piston ring arrangement according to the invention.
Figure 3:
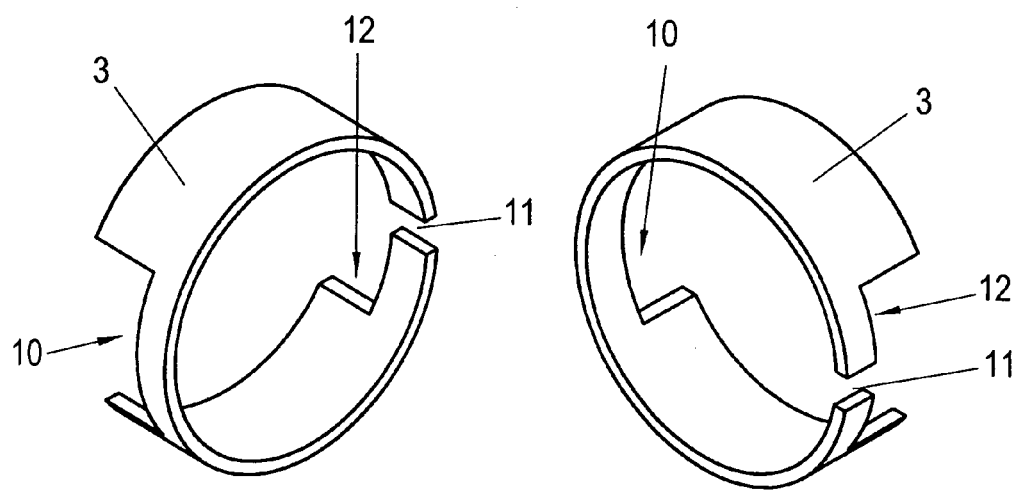
FIG. 3 shows in various views a representation of a sealing ring of a gastight piston ring arrangement according to the invention.

A preferred embodiment of a gastight piston ring arrangement 1 according to the invention is described below with reference to FIGS. 1 to 3. In the embodiment shown, the piston ring consists of two identical piston ring segments 2. At the ends of the piston ring segments 2, viewed in the peripheral direction, an axial step 5, 6 is respectively provided in a known manner, which axial steps sealingly cooperate with associated steps of the adjacent piston ring segments 2 to obtain a seal in the axial direction. The adjacent piston ring segments 2 here lie axially one against the other and (at least from a certain level of wear) are arranged spaced apart in the peripheral direction. As a result of the radial spacing, peripheral joints 8 are formed between the piston ring segments, which radial joints are sealed by the sealing ring 3, which bears radially against the inside of the peripheral surface 9 of the piston ring segments 2. The sealing ring 3 is here a single-cut ring (joint 11).

On the piston ring segments 2, a radial step 4, here a step which rises radially out of the inner peripheral surface 9 and extends over a part of the axial width of the piston ring segment 2, is provided on the inner peripheral surface 9. In the sealing ring 3, in accordance with the position and axial width of the steps 4, axial recesses 10, 12 are provided on the piston ring segments 2, which axial recesses cooperate with the steps 4. As a result of the steps 4, the sealing ring 3 is rotationally secured with respect to the piston ring segments 2, so that the joints 8 and 11 cannot end up in mutual alignment, which would destroy the sealing effect. The sealing ring 3 does not necessarily have to bear against the step 4 in the peripheral direction, but instead a certain play may well be present in the peripheral direction. All that matters is that the sealing ring 3 cannot rotate to the point where the joints 8 and 11 are mutually aligned.

The cross section of the sealing ring 3 can now be dimensioned such that the sealing ring 3 cannot, as a result of the thermal stress and the compressive load, deform into the joint gaps 8 between the piston ring segments 2. The axial recess 10 on the sealing ring 3 reduces the cross section of the sealing ring 3 in the region of the recess 10, the result of which is that the sealing ring 3 becomes pliable and, upon continued wearing of the piston ring segments 2, can nevertheless adequately expand and, for the maintenance of the sealing effect, press against the inner peripheral surface 9 of the piston ring segments 2.

In the preferred embodiment shown, two identical piston ring segments 2 are provided which respectively have a step 4, which steps are arranged opposite each other. The steps 4 are here provided in the middle (in the peripheral direction) of the piston ring segments 2, whereby the joints 8 and 11 are arranged mutually offset by about 90°. The recesses 10, 12 of the sealing ring 3 are likewise arranged mutually offset by 180°. The joint 11 of the sealing ring 3 is here preferably disposed in the region of one of the axial recesses 12. Furthermore, in the region of the transition from the radial step 4 to the peripheral surface 9, an axially extending undercut, as indicated in FIGS. 1 and 2, or a rounding, can be provided in said peripheral surface for production-related, mechanical (stress concentration reduction) and/or design reasons.

Figure 4:
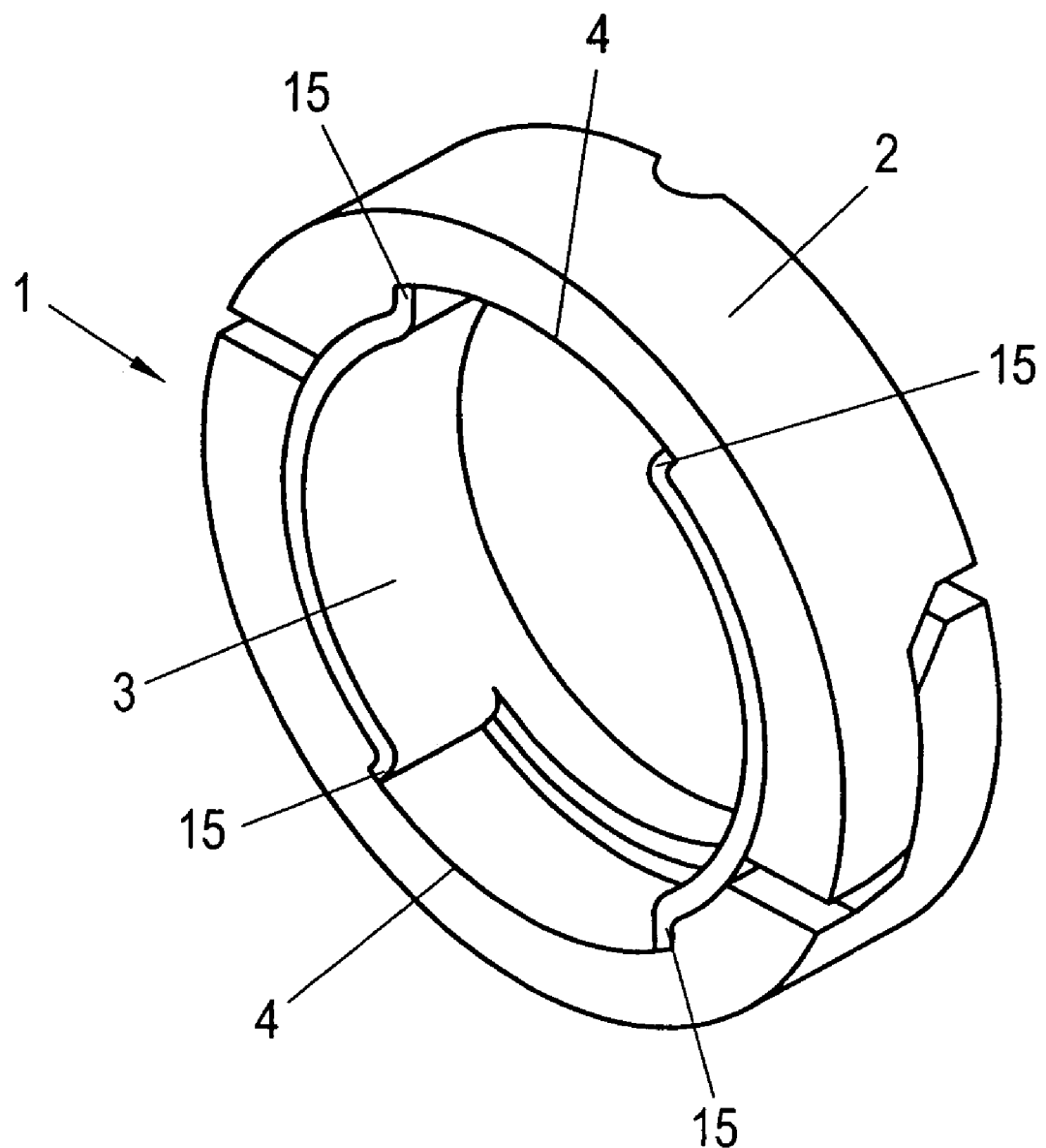
FIG. 4 shows in various views a representation of an alternative gastight piston ring arrangement without pressure balancing.

The step 4 does not have to rise radially out of the peripheral surface 9, however. It is also conceivable to configure the step 4 as a radial recess in the peripheral surface 9, as represented in FIG. 4. In order to obtain an anti-twist protection, the sealing ring 3 would then need to have corresponding radial projections 15, engaging in the step 4. To this end, for example, one (or both) end(s) of an axial recess 10, 12 of the sealing ring 3 could be bent radially outward to form a shoulder.

It is also possible, however, to provide a step 4 (as an elevation or recess) just on one piston ring segment 2. In this case, consequently, only one axial recess 10 would need also to be provided on the sealing ring 3. Likewise, more than two piston ring segments 2 can be provided.

The gastight piston ring arrangement 1 according to the invention can also be realized with a pressure balancing. To this end, a plurality of axial recesses 21, for example blind holes, lead away from an axial end face 13 of the piston ring or of the piston ring segments 2 and pass respectively into a radial recess 20, for example blind holes, opening out in the outer peripheral surface 14 of the piston ring segments 2.

The axial recess 21 is here preferably run along the neutral axis, i.e. in the region of the middle of the radial piston ring height, so as not to cause any stress concentrations/superelevations in high stress zones. A peripherally running groove, as was previously usual, is dispensed with to avoid reducing the strength/extrusion resistance of the ring. This type of pressure balancing works only in one direction, for which reason a radial groove 7 in the end face 13, in the region of the joint 11 of the sealing ring, ensures the single-acting sealing function.

The connection between the outer peripheral surface 14 and the axial end face 13 could also be realized, however, in any other chosen configuration, for example as an oblique through hole. The only crucial factor is that the pressure present on the inner peripheral surface 9 is conducted via the connection to the radial outer peripheral surface 14.

Figure 5:
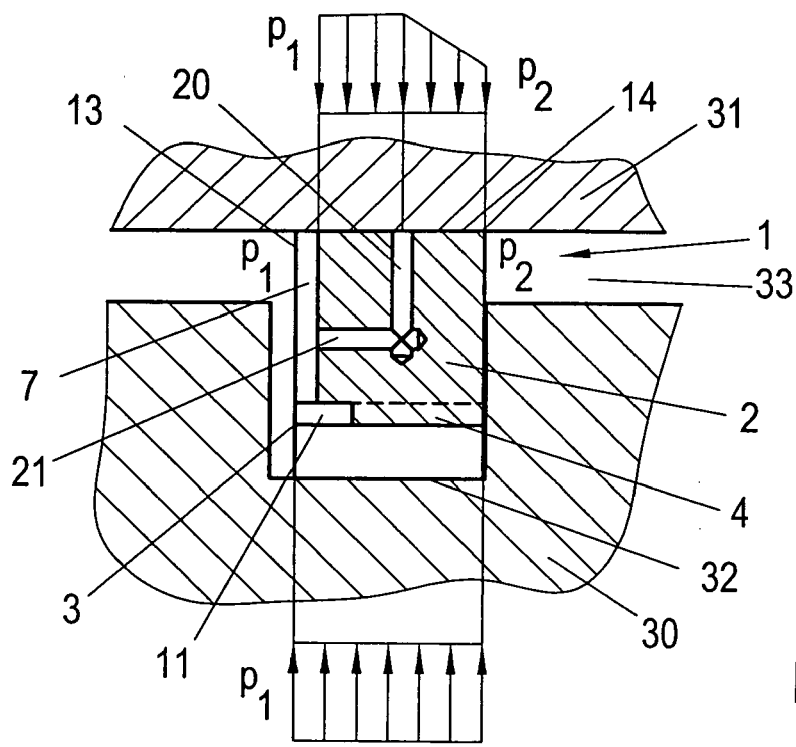
FIG. 5 shows an arrangement of a piston ring arrangement according to the invention in a piston.

In FIG. 5, a piston ring arrangement 1 according to the invention is inserted in a recess, for example a peripheral groove 32, of a piston 30 of a compressor. Of course, such a sealing can also be used in other applications, however, to seal between a movable and a fixed structural part, for example in a pneumatic cylinder. The piston ring or piston ring segments 2 bear(s) with the outer peripheral surface 14 against the wall of the cylinder 31 and form(s) a seal between a high pressure $p_1$, for example of a compressor chamber, and a low pressure $p_2$, for example the pressure between two adjacent piston rings. Radially on the inside, the piston ring arrangement 1 is radially distanced from the floor of the recess, here the groove 32, whereby radially on the inside the high pressure $p_1$ is present and the piston ring segments 2 are forced outward. For the working of the piston ring arrangement 1, it is immaterial whether the step 4 is arranged on the high pressure or low pressure side. For the pressure balancing, the axial end face 13 of the piston ring segments 2 is facing the high pressure $p_1$, which is conducted via the recesses 20, 21 to the sealing surface between the piston ring and the liner of the cylinder 31. The surface pressure between the piston ring and the cylinder 31, and thus also the wearing of the piston ring, is thereby reduced, as can be seen from the indicated pressure distribution.

In FIG. 5, a further problem of a piston ring, in particular in high pressure applications, is evident however. As a result of the high pressure $p_1$, namely, the piston ring segments 2, particularly in the case of softer, e.g. PTFE-based materials, and/or at high temperatures, can extrude into the annular gap 33 between the cylinder 31 and the piston 30, which would destroy, or at least considerably reduce, the sealing effect of the piston ring. For this reason, in the case of a single-acting piston ring, a backup ring can be provided on the side of the low pressure $p_2$, as represented in FIG. 6.

Figure 6:
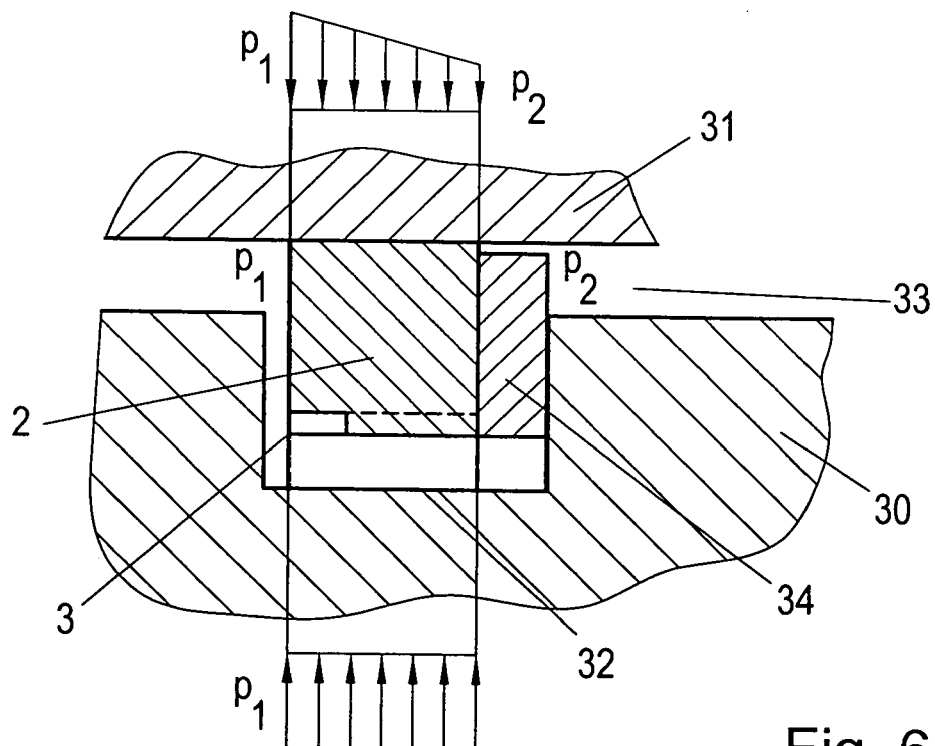
FIG. 6 shows an arrangement of a piston ring arrangement according to the invention in a piston with backup ring.

In FIG. 6, a non pressure-compensated piston ring arrangement 1 according to the invention is represented, in which, on the low pressure side, a backup ring 34 is provided. The backup ring 34 is here disposed between the piston ring and the wall of the groove 32, the backup ring 34 being radially distanced from the liner of the cylinder 31. The backup ring 34 can be made, for example, of metal.

The backup ring 34 can here be a through ring, for example for composite pistons 30, or a single-cut or multi-cut ring. In the case of cut backup rings 34, care can be taken to ensure that, as a result of the cut, no radial gap is formed which would lead to a leak and thus to deterioration of the sealing effect. The backup ring 34 is acted upon radially on the inside by the high pressure $p_1$, which attempts to expand the backup ring 34. The backup ring 34 must not however bear against the liner of the cylinder 31, since this can lead to a damaging of the liner. A cut backup ring 34 should therefore not only be gastight, but should additionally have sufficient peripheral tensile rigidity.

Figure 7:
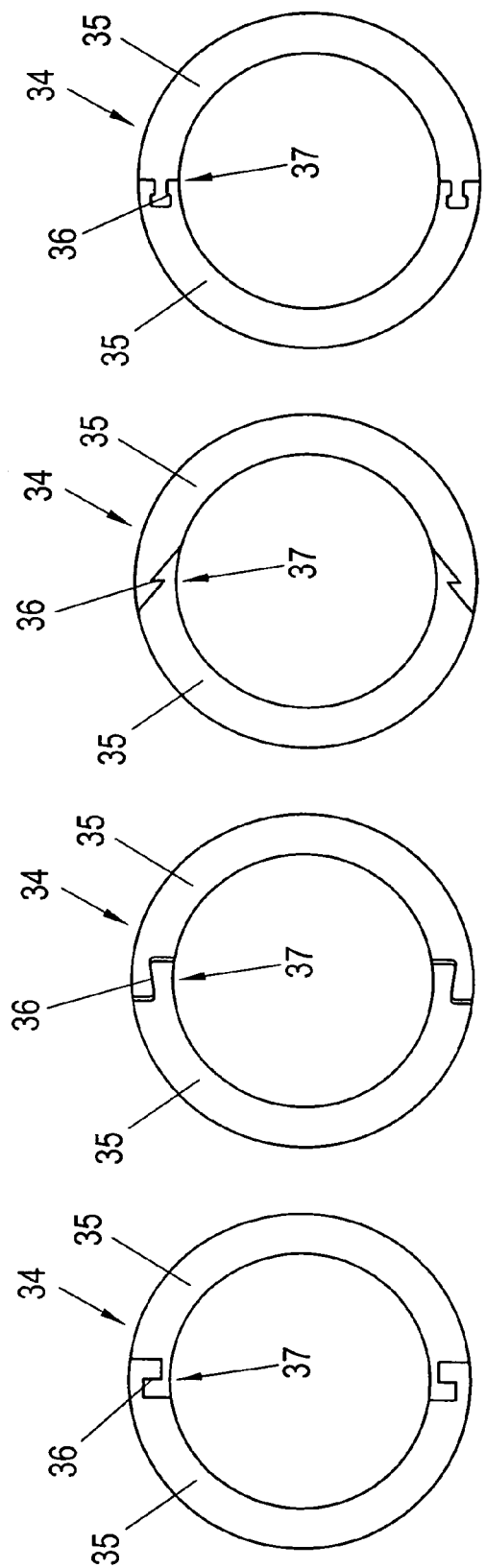
FIGS. 7 and 8 show various embodiments of a backup ring.

In FIG. 7, possible embodiments of cut backup rings 34 are represented. In the embodiments shown, the backup rings 34 are respectively doubly cut, which makes the backup rings usable also for non-composite pistons 30. The ends of the backup ring segments 35 in the peripheral direction are respectively realized with a stop face 36 which is radial or is angled relative to a tangential, which stop faces cooperate with a diametrically opposed stop face 26 of the adjacent backup ring segment 35. In addition, the ends of the backup ring segment 35 are radially stepped in the peripheral direction, the ends cooperating with a diametrically opposed radial step of the adjacent backup ring segment 35. In this way, the backup ring segments 35 are provided with a lock 37, which forms a seal in the radial direction and, at the same time, prevents divergence of the backup ring segments 35 in the peripheral direction.

Figure 8:
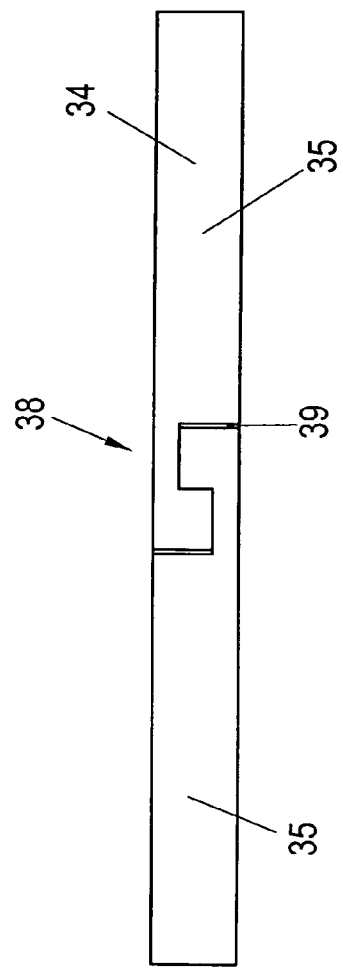

If a certain leakage is acceptable, an axial lock 38 can also be provided, as shown in FIG. 8. Though such a backup ring 34 has the necessary peripheral tensile rigidity, it also has radial leak gaps 39.

In double-acting piston rings, such a backup ring 34 can be arranged on both sides of the piston ring, or two diametrically opposed, axially spaced piston rings with backup ring 34 can be provided, in the piston 30, the backup rings 34 being arranged facing each other.

It should here be mentioned that such a backup ring 34 can be used basically in any piston ring, not only in a piston ring according to the invention, to prevent the extrusion of the piston ring into the radial annular gap 33.

The invention claimed is:

1. A gastight piston ring assembly which comprises:
   a piston ring which comprises first and second ring segments that have respective stepped peripheral ends, stepped peripheral ends of the first ring segment contacting respective stepped peripheral ends of the second ring segment to provide an axial seal, said first ring segment including a first radial step at an inner surface thereof, said radial step having an axial width that is less than an axial width of said first ring segment and a length in a peripheral direction less than a peripheral length of said first segment, and
   a one-piece, single cut sealing ring positioned radially inwardly of said piston ring so as to contact inner peripheral surfaces of said first and second ring segments, said sealing ring including a first recess which extends through a radial thickness thereof and cooperates with said first radial step to prevent rotation of said sealing ring relative to said piston ring.

2. The gastight piston ring assembly as claimed in claim 1, wherein said second ring segment includes a second radial step at an inner surface thereof, and said sealing ring includes a second recess that cooperates with said second radial step to prevent rotation of said sealing ring relative to said piston ring.

3. The gastight piston ring assembly as claimed in claim 1, wherein the first radial step extends away from the inner peripheral surface of the first ring segment and extends into the first recess in the sealing ring.

4. The gastight piston ring assembly as claimed in claim 1, wherein the first radial step comprises a radial recess in the peripheral surface of the first ring segment, and the first recess of the sealing ring includes a radial projection which engages in the first radial recess.

5. The gastight piston ring assembly as claimed in claim 1, wherein the first piston ring segment includes a plurality of recesses, which connect an end side of the first piston ring segment to an outer peripheral surface of the first piston ring segment.

6. The gastight piston ring assembly as claimed in claim 5, including a radial groove in the end side of the first piston ring segment which is located near a joint of the sealing ring.

7. The gastight piston ring assembly as claimed in claim 1, including a backup ring which bears against an end side of the first and second piston ring segments.

8. The gastight piston ring assembly as claimed in claim 7, wherein the backup ring comprises a solid ring.

9. The gastight piston ring assembly as claimed in claim 7, wherein the backup ring is a single-cut or multi-cut ring, and the backup ring segments are held together in the peripheral direction by a lock.

10. The gastight piston ring assembly as claimed in claim 9, wherein the backup ring segments are sealed in the radial direction by the lock.

11. A seal between a movable structural part and a fixed structural part, said movable structural part including a recess, and a gastight piston ring assembly as claimed in claim 7.

12. The seal as claimed in claim 11, wherein the recess in the first piston ring segment opens out on an end side facing high pressure ($p_1$).

13. The seal as claimed in claim 11, wherein the backup ring bears against the end side facing low pressure ($p_2$).

14. A compressor comprising a cylinder and a piston, said piston being arranged in the cylinder, and in a recess of the piston, a piston ring assembly as claimed in claim 1.

* * * * *